A. A. MERRITT.
MEANS FOR FIXING MACHINE ELEMENTS ON SHAFTS.
APPLICATION FILED SEPT. 30, 1913.
1,134,478. Patented Apr. 6, 1915.
Fig. 1.
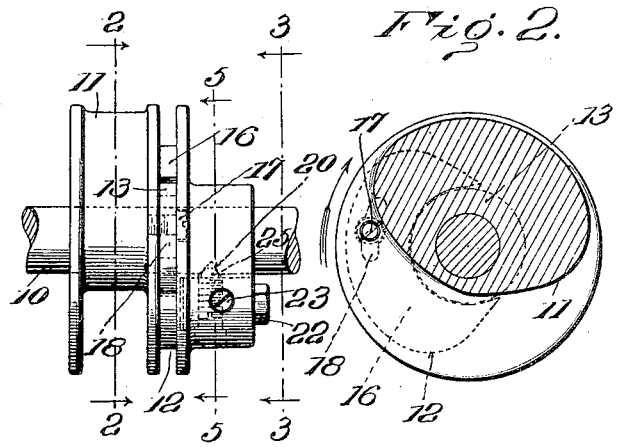
Fig. 2.
Fig. 3.
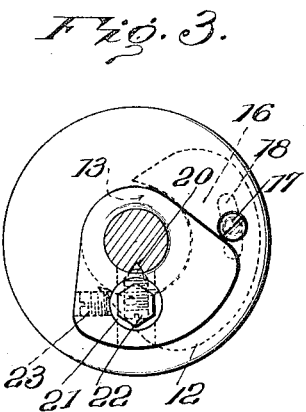
Fig. 4.
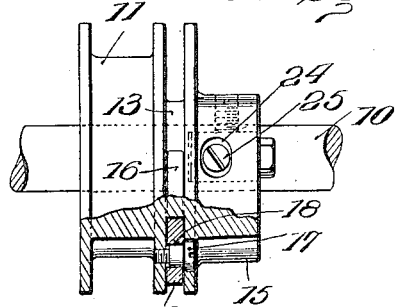
Fig. 5.
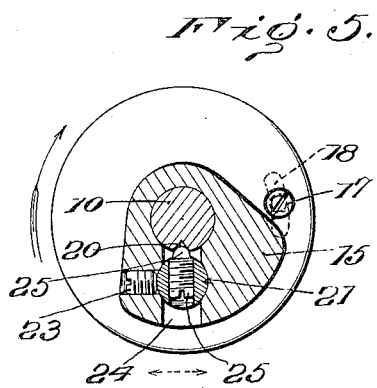
Fig. 6.
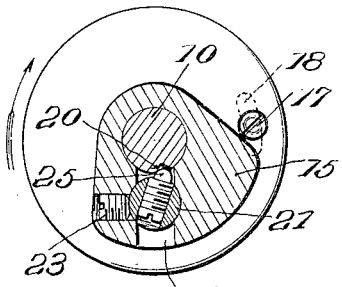
Fig. 7.
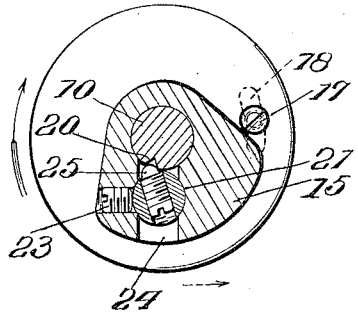
Witnesses
J. B. Vegengst
E. E. Warfield
Inventor
Arthur A. Merritt
By Munn & Cameron Lewis & Massie
Attorney

UNITED STATES PATENT OFFICE.

ARTHUR A. MERRITT, OF WORCESTER, MASSACHUSETTS, ASSIGNOR TO WILLCOX & GIBBS SEWING MACHINE CO., OF NEW YORK, N. Y., A CORPORATION OF NEW YORK.

MEANS FOR FIXING MACHINE ELEMENTS ON SHAFTS.

1,134,478.     Specification of Letters Patent.     Patented Apr. 6, 1915.

Application filed September 30, 1913. Serial No. 792,648.

*To all whom it may concern:*

Be it known that I, ARTHUR A. MERRITT, of Worcester, Massachusetts, have invented a new and useful Improvement in Means for Fixing Machine Elements on Shafts, which invention is fully set forth in the following specification.

A common way of fastening a rotary take-up of a sewing-machine upon its shaft is by a set-screw having a conical or tapered point engaging a spot or conical seat on the shaft. Similar means are extensively employed in all kinds of machinery,—for example in fastening wheels to their shafts— and hence the application of the present invention is not restricted to sewing-machines. While much care is taken to accurately locate the spot or seat to time the action of the take-up with relation to the action of other parts, it not infrequently happens that the seat, in a particular machine, or under particular operating conditions, or for a particular character of work to be done by the machine, is not in the precise position desired. In some classes of machinery or apparatus it is customary to provide a plurality of differently positioned seats, but that is not satisfactory and practicable, particularly where the desired variation in the positioning of the parts is so small that parts of two contiguous seats would coincide.

It is the object of the present invention to meet such conditions, and this is accomplished by providing an adjustment which enables the seat-engaging point to engage its seat either in a direction radial to the axis of the shaft, or in a tangential direction to one side or the other of said radial direction. Or in other words, the adjustment provides for varying the angle of the position of the set-screw or securing element relative to the shaft and also relative to the machine element or member upon which it (the set-screw) is mounted, thereby varying the direction of engagement of the securing element with the seat on the shaft and hence the position in which said machine element or member is secured to the shaft or like part to which it is to be fixed.

The invention may be more fully understood by reference to the accompanying drawing illustrating what is now regarded as the preferred embodiment thereof as applied to a rotary take-up and its shaft of a sewing-machine, but, as before stated, the invention is not limited to the particular adaptation thus illustrated.

Figure 1 is a front elevation of a double rotary sewing-machine take-up and a portion of its shaft, with the invention applied in securing the former to the latter; Fig. 2 is a vertical transverse section on line 2—2 of Fig. 1; Fig. 3 is a similar section on line 3—3 of Fig. 1; Fig. 4 is a front elevation with the take-up turned to a different position than in Fig. 1, and partly broken away and sectioned; Figs. 5, 6 and 7 are vertical transverse sections on line 5—5 of Fig. 1, showing different positions of adjustment respectively.

10 is the take-up shaft of a sewing-machine, on which is mounted a double rotary take-up having a cam-like take-up surface or part 11 adapted to act upon needle-threads, and a cam-like take-up surface or part 12 adapted to act upon a cross-thread. An analogous double take-up and its action upon four needle-threads and a cross-thread are more fully explained in my Patent No. 1,041,652, dated October 15, 1912, sewing machine.

The part 11 is preferably cast or formed in one piece to include hub or collar 13 and an eccentrically positioned body-portion 15. A crescent-shaped member 16 fits closely about the collar 13. The outer edge of the member 16, continued between the ends of the latter by the peripheral edge of hub 13, constitutes the cam-like take-up surface 12. The member 16 is adjustably secured in position by a set-screw 17 passing loosely through an opening in one of the flanges of part 11 and through an arc-shaped slot 18 in member 16 and at its inner end making screw-threaded engagement with another flange of the part 11. As will be apparent, the set-screw 17 may be loosened and the member 16 of the take-up adjusted or turned to relatively adjust or change the time of action of the two take-up surfaces 11 and 12 upon their threads.

20 is a conical seat or "spot", carefully positioned and formed in the surface of shaft 10 to time the action of the take-up with relation to the action of the needles, loopers and other parts (not shown) of a sewing machine.

21 is a cylindrical plug or element rotatable in a cylindrical socket or recess in body portion 15 of the take-up and having a projecting hexagonal head 22 for engagement by a wrench. A set-screw 23, countersunk in an opening intersecting the socket or plug 21, serves to immovably secure said plug in any position of its adjustment.

24 is a radial opening in body-portion 15 intersecting the socket for plug 21 and the central opening for shaft 10. A set-screw 25, put in place through opening 24, is countersunk in a screw-threaded opening extending transversely through plug 21, and its inner tapered (preferably rounded) end is adapted to engage the seat or spot 20 of the shaft 10.

As shown in Fig. 5, the plug 21 is set to position set-screw 25 radially to shaft 10; the angular position of the set-screw is therefore also radial with respect to the axis of the machine element, part, or take-up, to be fixed to the shaft. To advance the action of the take-up, the set-screw 23 is loosened, the plug 21 turned (by a wrench engaged with its head 22) to tilt the set-screw 25 to the position shown in Fig. 6, the rounded end of the set-screw turning in seat 20, and the set-screw 23 then tightened. By such rotary adjustment there is effected a change in the angle of the position of the set-screw or securing element 25 relative to the shaft and its seat and also relative to the take-up, and thereby a change in the position of the take-up on the shaft. To retard the action of the take-up, the same procedure is followed, except that plug 21 is turned in the opposite direction, as shown in Fig. 7.

The means of this invention as thus applied to a take-up which acts upon needle-threads affords a latitude of adjustment which enables said take-up to be so set on its shaft with relation to the movement of the needles, loopers and other parts, in a stitch-forming cycle, as to get just the proper take-up action on the needle-threads at the proper time in the cycle. For example, if the take-up is too far advanced with relation to the action of the other parts of the machine, it may so prematurely tighten the needle-threads as to prevent loops thereof from throwing or spreading outward from the needles on upward movement of the latter, thereby preventing the loopers from properly entering said loops of the needle-threads. On the other hand, if the take-up be unduly retarded, the needle-threads may be so prematurely slackened as to enable two or more loopers to pass through one and the same needle-thread loop, thereby inevitably breaking one or more threads.

If the means of this invention be applied to a take-up which acts upon looper threads (such as shown in my aforesaid patent) and the take-up be too far advanced on its shaft, it will allow the looper threads to slacken prematurely, with the result that such thread may become disengaged from the teeth of the loop-spreader before the descending needles penetrate the looper-thread loops.

When the means of this invention are applied to a double take-up such as illustrated, relative adjustment of the two parts of the take-up (by means of screw 17 and slot 18, for example) may render desirable a slight change in the position of the take-up on its shaft 10. This may be accomplished by the means provided.

What I claim is:

1. In combination, a shaft having a seat thereon, a member to be secured to the shaft, and a securing element adapted to engage said seat and adjustably mounted upon said member to vary the angle of its position upon the member and relative to the shaft and thereby the direction of its engagement with the seat and the position in which it secures the member to the shaft.

2. In combination, a shaft having a seat thereon, a member to be secured to the shaft and a securing element adapted to engage said seat and mounted upon said member to be rotatably adjustable on an axis approximately parallel to the shaft to vary the angle of the position of the securing element relative to the shaft and the direction of its engagement with the seat and thereby the position in which it secures the member to the shaft.

3. In combination, a shaft having a seat thereon, a member to be fixed to the shaft, and a securing element adapted to engage the seat on the shaft and rotatably mounted upon said member to vary the angle of its position upon the member and relative to the shaft and thereby the direction of its engagement with the seat and the position in which the member is secured to the shaft.

4. In combination, a shaft having a seat thereon, a machine part to be fixed to the shaft, and an element having a point adapted to engage the seat on the shaft to lock the machine part to the shaft, said element being rotatably mounted upon the machine part and adapted by its rotation to change the angle of its position upon said part and relative to the shaft and the direction of engagement of the point with the seat, thereby varying the position in which the machine part is locked to the shaft.

5. In combination, two parts adapted to be locked together, and a securing element adapted to engage a seat on one part, said element being rotatably mounted upon the other part and adapted by its rotation to change the angle of its position upon the part on which it is mounted and relative to the other part and the direction of its engagement with the seat thereon to thereby lock the parts together in different positions of relative adjustment.

6. In combination, a shaft having a seat thereon, a member to be fixed to the shaft, an element rotatably mounted upon the member, and a set-screw carried by said element and adapted to engage the seat on the shaft, said element being adapted by its rotation to change the direction of engagement of the set-screw with the seat and thereby lock the member to the shaft in different positions of relative adjustment.

7. In combination, a shaft having a seat thereon, a member to be fixed to the shaft, an element rotatably mounted upon the member, a set-screw adapted to engage said element to lock it in any position to which it is rotated, and a set-screw carried by said element and adapted to engage the seat on the shaft, said element being adapted by its rotation to change the direction of engagement of the set-screw carried thereby with the seat and thereby lock the member to the shaft in different positions of relative adjustment.

8. In combination, a shaft having a seat thereon, a member to be fixed to the shaft, a cylindrical plug rotatably mounted in a socket in the member and at its outer end provided with means adapted to be engaged in rotating the same; and a set-screw engaging an opening transversely through the plug and at its inner end engaging the seat on the shaft.

In testimony whereof I have signed this specification in the presence of two subscribing witnesses.

ARTHUR A. MERRITT.

Witnesses:
T. L. CHURCHY,
PEARCE DRUMMOND.

Copies of this patent may be obtained for five cents each, by addressing the "Commissioner of Patents, Washington, D. C."